(12) United States Patent
Fix et al.

(10) Patent No.: US 10,257,585 B2
(45) Date of Patent: *Apr. 9, 2019

(54) METHOD AND APPARATUS FOR DIRECTED ADVERTISEMENT

(71) Applicants: AT&T Intellectual Property I, L.P., Atlanta, GA (US); AT&T Mobility II LLC, Atlanta, GA (US)

(72) Inventors: Jeremy Fix, Acworth, GA (US); Sheldon Kent Meredith, Roswell, GA (US); Juliette Zerick, Alpharetta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,692

(22) Filed: Mar. 14, 2018

(65) Prior Publication Data
US 2018/0206006 A1 Jul. 19, 2018

Related U.S. Application Data

(63) Continuation of application No. 15/606,942, filed on May 26, 2017, now Pat. No. 9,948,996, which is a
(Continued)

(51) Int. Cl.
*H04N 7/18* (2006.01)
*H04N 21/81* (2011.01)
(Continued)

(52) U.S. Cl.
CPC ......... *H04N 21/812* (2013.01); *H04N 21/222* (2013.01); *H04N 21/252* (2013.01);
(Continued)

(58) Field of Classification Search
CPC .. H04N 21/812; H04N 21/222; H04N 21/252; H04N 21/25883; H04N 21/4126;
(Continued)

(56) References Cited

U.S. PATENT DOCUMENTS 8,060,399 B2 11/2011 Ullah
8,528,014 B2 9/2013 Reynolds et al.
(Continued)

OTHER PUBLICATIONS

Marilly, et al., "WellCom: When Mobile Terminals Meet Television." Next Generation Mobile Applications, Services and Technologies, 2009. NGMAST'09. Third International Conference on. IEEE, 2009.

*Primary Examiner* — John R Schnurr
(74) *Attorney, Agent, or Firm* — Guntin & Gust, PLC; Matthew Tropper (57) ABSTRACT

Aspects of the subject disclosure may include, for example, receiving registration information indicating a plurality of registered communication devices in proximity to a set-top box, the plurality of registered communication devices being registered according to a communication exchange between the set-top box and each of the plurality of registered communication devices, identifying a group of users associated with the plurality of registered communication devices, and determining characteristics for the group of users according to the identifying of the group of users, correlating the characteristics for the group of users, selecting a directed advertisement according to the correlating of the characteristics, and providing the directed advertisement to the set-top box for presentation. Other embodiments are disclosed.

20 Claims, 6 Drawing Sheets

Related U.S. Application Data continuation of application No. 14/676,229, filed on Apr. 1, 2015, now Pat. No. 9,693,114.

(51) Int. Cl.
| | | |
|---|---|---|
| *H04N 21/258* | (2011.01) | |
| *H04N 21/41* | (2011.01) | |
| *H04N 21/25* | (2011.01) | |
| *H04N 21/45* | (2011.01) | |
| *H04N 21/222* | (2011.01) | |
| *H04N 21/436* | (2011.01) | |
| *H04N 21/4363* | (2011.01) | |
| *H04N 21/442* | (2011.01) | |

(52) U.S. Cl.
CPC ... *H04N 21/25883* (2013.01); *H04N 21/4126* (2013.01); *H04N 21/43615* (2013.01); *H04N 21/43637* (2013.01); *H04N 21/44218* (2013.01); *H04N 21/4516* (2013.01); *H04N 21/4532* (2013.01)

(58) Field of Classification Search
CPC ....... H04N 21/43615; H04N 21/43637; H04N 21/44218; H04N 21/4516; H04N 21/4532
See application file for complete search history.

(56) References Cited

U.S. PATENT DOCUMENTS

| | | |
|---|---|---|
| 8,683,502 B2 | 3/2014 | Shkedi et al. |
| 8,752,087 B2 | 6/2014 | Begeja et al. |
| 8,849,199 B2 | 9/2014 | Shrum, Jr. et al. |
| 8,863,174 B2 | 10/2014 | Neil et al. |
| 2008/0109888 A1 | 5/2008 | Ullah |
| 2009/0157473 A1 | 6/2009 | Belz et al. |
| 2010/0229194 A1 | 9/2010 | Blanchard et al. |
| 2011/0072452 A1 | 3/2011 | Shimy et al. |
| 2012/0135684 A1 | 5/2012 | Shrum, Jr. et al. |
| 2013/0036011 A1 | 2/2013 | Roberts et al. |
| 2013/0060601 A1 | 3/2013 | Kodialam et al. |
| 2014/0040935 A1 | 2/2014 | Gharachorloo et al. |
| 2014/0074621 A1 | 3/2014 | Chai et al. |
| 2014/0228055 A1 | 8/2014 | Karaoguz |
| 2016/0295263 A1 | 10/2016 | Fix |
| 2017/0264972 A1 | 9/2017 | Fix et al. |

# METHOD AND APPARATUS FOR DIRECTED ADVERTISEMENT

CROSS-REFERENCE TO RELATED APPLICATION(S)

This application is a continuation of U.S. patent application Ser. No. 15/606,942, filed May 26, 2017, which is a continuation of U.S. patent application Ser. No. 14/676,229, filed Apr. 1, 2015, now U.S. Pat. No. 9,693,114. All sections of the aforementioned application(s) and patent(s) are incorporated herein by reference in their entirety.

FIELD OF THE DISCLOSURE

The subject disclosure relates to a method and apparatus for directing advertisements.

BACKGROUND

Some media services such as television broadcast services or streaming media services provide advertisements during portions of a presentation of media content. The effectiveness of such advertisements depends on the interests of the viewers.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for providing directed advertising. Other embodiments are described in the subject disclosure.

One embodiment of the subject disclosure includes receiving registration information indicating a plurality of registered communication devices in proximity to a set-top box, the plurality of registered communication devices being registered according to a communication exchange between the set-top box and each of the plurality of registered communication devices, identifying a group of users associated with the plurality of registered communication devices, and determining characteristics for the group of users according to the identifying of the group of users. The embodiment can further include correlating the characteristics for the group of users, selecting a directed advertisement according to the correlating of the characteristics, and providing the directed advertisement to the set-top box for presentation.

One embodiment of the subject disclosure includes a set-top box including a memory that stores instructions and a processor coupled to the memory, wherein responsive to executing the instructions, the processor performs operations including identifying a plurality of communications devices in proximity to the set-top box, the plurality of communication devices being registered according to a communication exchange between the set-top box and each of the plurality of communication devices, identifying a group of users associated with the plurality of communication devices, providing identification information relating to the group of users to a content delivery server, receiving an advertisement directed to the group of users from the content deliver server, and providing the advertisement to the set-top box for presentation.

One embodiment of the subject disclosure includes a machine-readable storage device, wherein responsive to executing the instructions, a processor performs operations including detecting that a media processor is in proximity to a mobile communications device and providing information to a content delivery server indicating that the mobile communications device is in proximity to the media processor to initiate delivery by the content delivery server of an advertisement directed at targeting a user of the mobile communications device based on a characteristic of the user of the mobile communications device.

Figure 1:
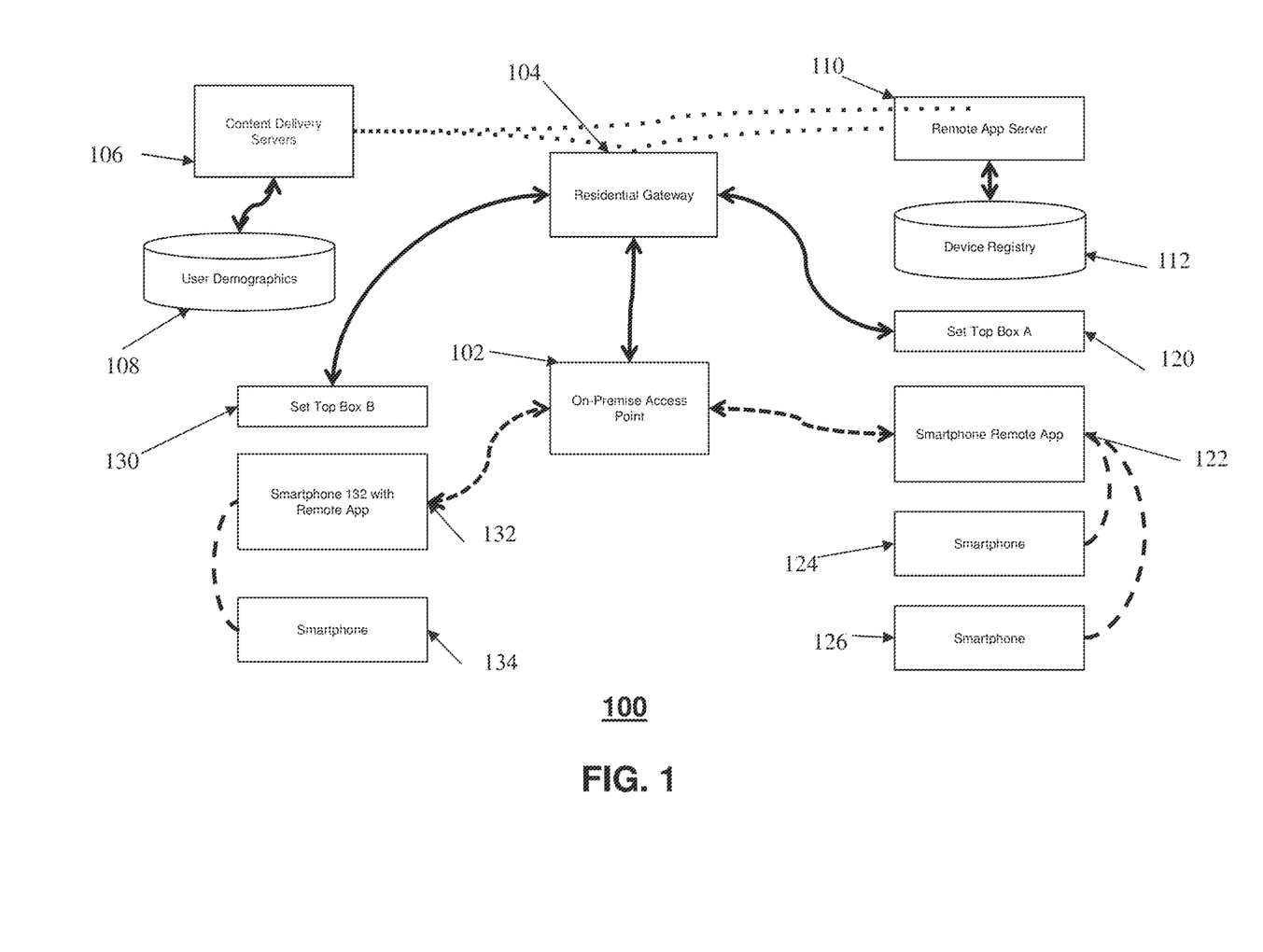
FIG. 1 depicts an illustrative embodiment of a system for directing advertisements.

FIG. 1 depicts an illustrative embodiment of a communication system 100 for directing advertisements. Communication system can include a content delivery servers 106 that are operated by interactive television service providers. Communication system 100 can include a residential gateway 104 that connects to the content delivery servers 106 through a service provider network infrastructure, a remote application server 110, or a device registry 112 that manages information exchange between smartphone remote applications or "apps" installed on mobile communications devices, such as mobile devices 122 and 132, a collection of set top boxes 120 and 130 which can both be provided in a single user's house, an on premises access point 102 which can provide Internet connections, such as Wi-Fi connectivity to the mobile devices 122, 124, 126, 132, and 134 in the home, where some of the mobile devices can utilize Bluetooth or other near-field communication capabilities.

Exemplarily, connectivity throughout the home includes use of wired and wireless connections depending on a customer configuration. The residential gateway 104 receives content from the content delivery servers 106 through either a multicast or unicast tunnel, for example, based on the content. The residential gateway 104 provides an application tunnel between the remote application server 110, which can be located at an application data center, and the applications or "apps" can be loaded onto and operated by various mobile devices, such as mobile device remote application 122. The smartphone remote app and the remote application server 110 can provide a mechanism for allowing the user to control a set-top box of choice (either set-top box A 120 or set-top box B 130, for example). The smartphone remote app can also allow the smartphone or other communication devices to detect other communications devices in proximity to it and to a set-top box.

For example, in FIG. 1, Smartphone 122 includes an application that controls set-top box A 120. In addition, exemplary smartphone remote apps can provide the remote application server 110 with an indication of which user is controlling set-top box A 120. The remote server app on smartphone 122 communicates with the content delivery servers 106 through a tunnel and updates the content delivery server 106 with a current user identity of who is in control of set-top box A 120. In addition, the remote server app on smartphone 122 can locate other nearby communication devices and report those devices to the content delivery server 106 or the remote application server 110.

Once the content delivery servers 106 are aware of which users are watching the internet television provider's content as provided, for example on displays associated with the either one of set-top box A 120 or set-top box B 130 in a same residence or Internet television provider account, directed advertising can occur. In addition to providing the user ID, the remote application server 110 can communicate relevant demographic profiles which may be stored in a user demographic system 108 that enables the content delivery servers 106 to provide highly directed advertising.

In addition, when multiple users are watching the same set-top box (such as set-top box A 120), the smart phone app 122 can also detect signatures of nearby devices (this can include near field communications, Bluetooth communication capabilities, or detecting a signal from the mobile devices). Whenever a signal is detected, the ID of the signal is sent back to the remote application server 110 where identification matching can occur for the device detected to reveal an additional user ID watching the set-top box A 120. These additional viewer and/or viewers are communicated to the content delivery servers 106 where rules and other guidelines can be provided to communicate advertisements that are relevant to all parties watching at any specific moment in time.

The content delivery server 106 can determine characteristics for the group of users according to the identifying of the group of users. The content deliver server 106 can access the user demographic system 108 to determine these characteristics. The content delivery server 106 can correlate the characteristics for the group of users and select a directed advertisement according to these correlated characteristics.

In additional embodiments, the content delivery servers 106 can weigh the group characteristics depending on which user is present. For example, weighting of first characteristics of a first user having a first registered communication device that is controlling presentation of the content by the set-top box can be given preferences when determining the directed advertisements. In other embodiments, users with appealing demographics, higher end service plans, or higher income can be given priority when weighting the characteristics for determining the directed advertisements. Furthermore, when the number of users change, the content deliver server 106 can perform revising of the characteristics for the group of users based on the new group of users.

In some embodiments, a set-top box or a mobile device can identify a non-viewing user of the group of users that is in proximity to the set-top box. Based on this identification, the devices can determine the person is not viewing content being presented by the set-top box based on image pattern recognition of an image of a viewing area of the set-top box or mobile devices. For example, it may be determined that the person is not looking at the display device during the broadcast to the set-top box. Based on this determination, the content delivery server 106 can ultimately exclude non-viewer characteristics of the non-viewing user from the correlating of the characteristics.

Figure 2:
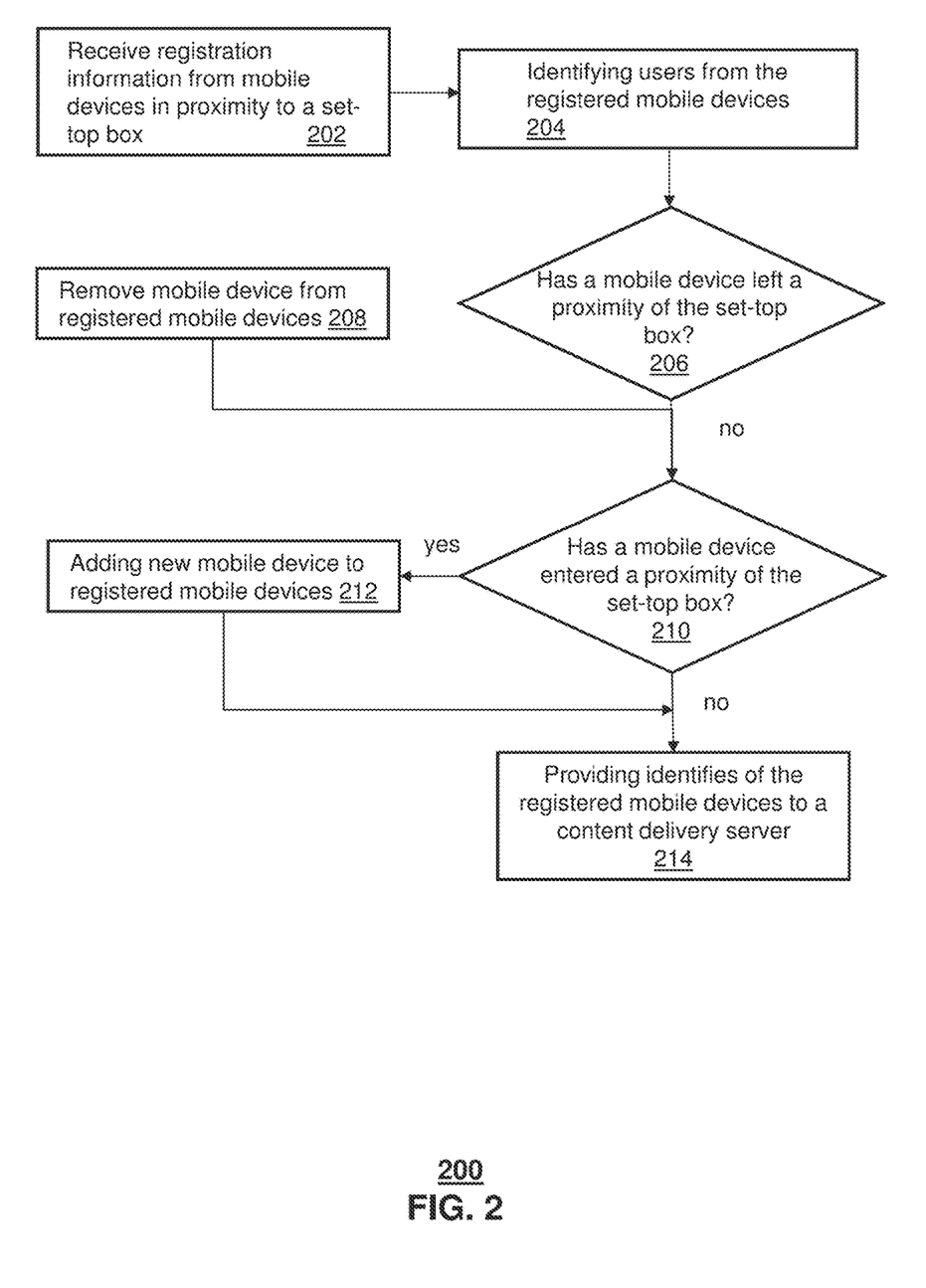
FIG. 2 depicts an illustrative embodiment of a method used in portions of the system described in FIG. 1.

FIG. 2 depicts an illustrative embodiment of method 200 that can be used in portions of system 100 described in FIG. 1. Method 200 can begin with step 202 in which a set-top box receives information from one or more mobile devices in proximity to the set-top box. In additional embodiments, a mobile device can determine its proximity to the set-top box as well as the presence of any other mobile devices in proximity to it.

Mobile devices that are in proximity to the set-top box can refer to mobile devices in a same room as the set-top box to exemplarily determine the owner of the device is watching content from the set-top box on a display associated with the set-top box. Determining proximity can be accomplished in a variety of exemplary embodiments. In one embodiment, the mobile devices may be detected through a utilization of Bluetooth or other near-field communication capabilities of the mobile devices and the set-top boxes. In some embodiments, the set-top box can detect a Bluetooth signal from a mobile device and determine if the mobile device is in the same room as the set-top box.

In other embodiments, the set-top box can utilize a received signal strength indicator (RSSI) to determine that a signal strength from a mobile device is of sufficient power to indicate the mobile device is nearby. A mobile device emitting a signal with less than a predetermined signal strength may be determined as not being in the room with the set-top box or otherwise too far away to count as being in proximity. In other exemplary embodiments, the set-top box can be in a communication with a camera device to determine that the user of a detected mobile device is actually in view of the display or actually facing the display. Exemplarily, a mobile device is detectable as being within proximity to a particular set-top box in a household having multiple set-top boxes so as to determine which person is watching which display associated with the set-top boxes.

In step 204, the users associated with each detected mobile device can be determined. In this way, the viewers for a particular set top box can be determined. In addition, in step 206, it can be determined whether a mobile device has left the proximity of the set-top box and then in step 208, that viewer's mobile device can be removed from the list of registered devices. Similarly, in step 210, it can be determined if a new mobile device has entered into a proximity to the set-top box. In step 212, the newly arrived mobile device can be added to the list of registered mobile devices.

Determining the identities of the viewers in the list of registered mobile devices in step 204 can take place at the set-top box, such as set top box A 120, the remote application server 110, the content delivery servers 106, or the user demographic system 108 as illustrated in FIG. 1. At step 214, these identities can be reported to the content delivery servers 106 to create or retrieve directed advertisements for the detected viewers.

Figure 3:
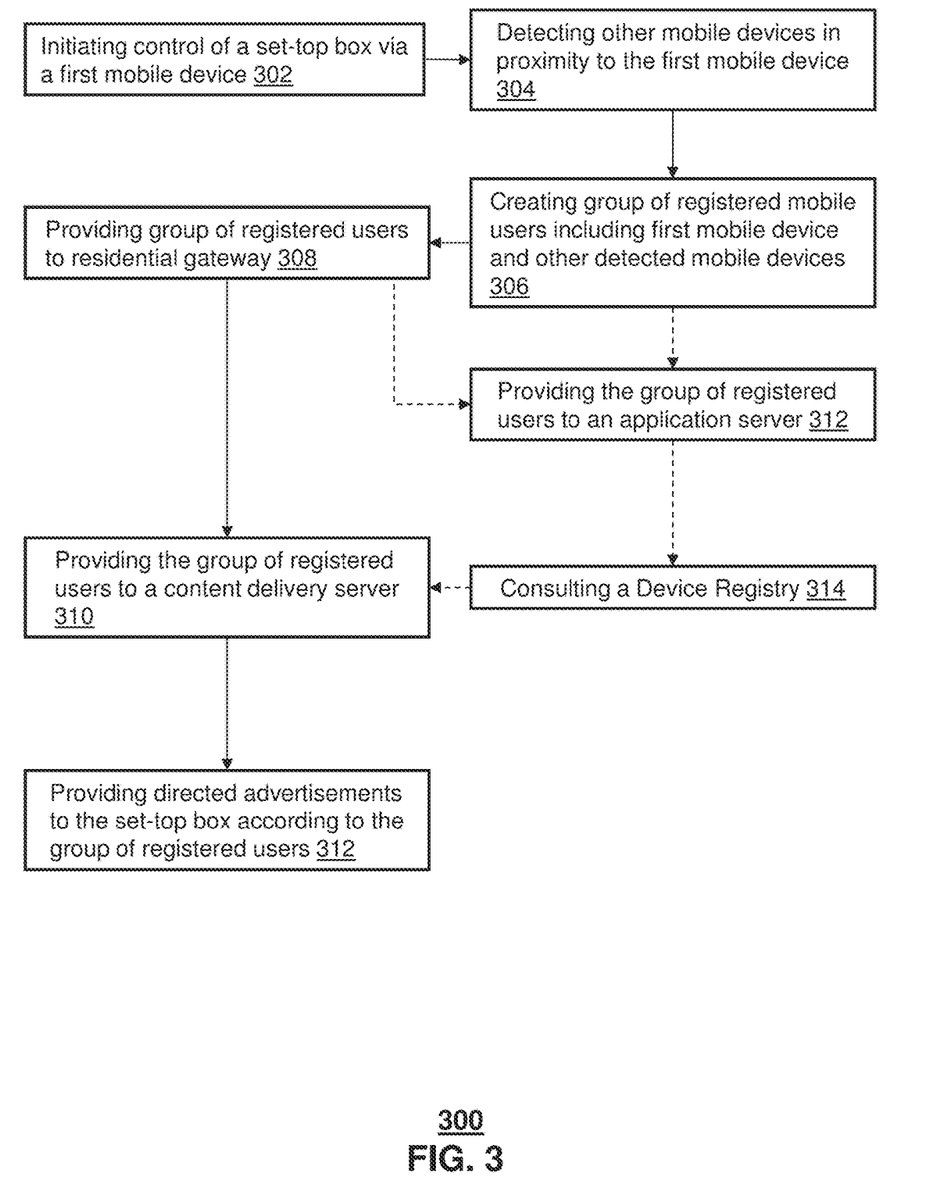
FIG. 3 depicts an illustrative embodiment of a method used in portions of the system described in FIG. 1.

FIG. 3 depicts an illustrative embodiment of a method 300 used by portions of the system 100 illustrated in FIG. 1. In some embodiments, a mobile device may be used to control a set-top box. In households with multiple set-top boxes, each set-top box may be controlled by a different or the same mobile devices. In step 302, control of the set-top box by a mobile device is initiated. In step 304, the mobile device can detect other mobile devices that are in proximity to it. Referring to FIG. 1, for example, the second mobile device 122 is running an application that allows it to control set-top box A 120. In addition, the app being run on mobile device 122 has also detected the third mobile device 124 and the fourth mobile device 126.

Returning to FIG. 3, the detected mobile devices and the controlling mobile devices are counted as a group of registered users. In some embodiments, the detected mobile devices and the controlling mobile devices are stored as a group of registered devices. If the detected mobile devices and the controlling mobile devices are registered as a group of devices, users of the group of devices can be determined by any of the remote application server 110, the content delivery servers 106, or the user demographic system 108 as illustrated in FIG. 1. The group of registered users can then be provided to a residential gateway, such as residential gateway 104 of FIG. 1, by the controlling mobile device in step 308. The mobile devices can communicate with the residential gateway via an on premise access point 102 or through the mobile device's own Internet connection. In other embodiments, the mobile devices can communicate directly with the remote application server 110 through the mobile device's own Internet connection.

In alternative embodiments, as depicted by the dashed lines, the group of users can be provided to the remote application server 110 for the application being run on the controlling mobile device which controls the set-top box in step 312. At step 314, a device registry 112 can be consulted to determine the group of users of the mobile devices. For example, the mobile devices can be recorded at the device registry 112 or the device registry 112 can determine who the users of the mobile devices are through other means. The group of users can then be provided to the content delivery servers 106.

In step 310, the group of registered users are provided to the content delivery servers 106. In step 312, the content delivery server can then provide directed advertising to the set-top box for the group of registered users.

Figure 4:
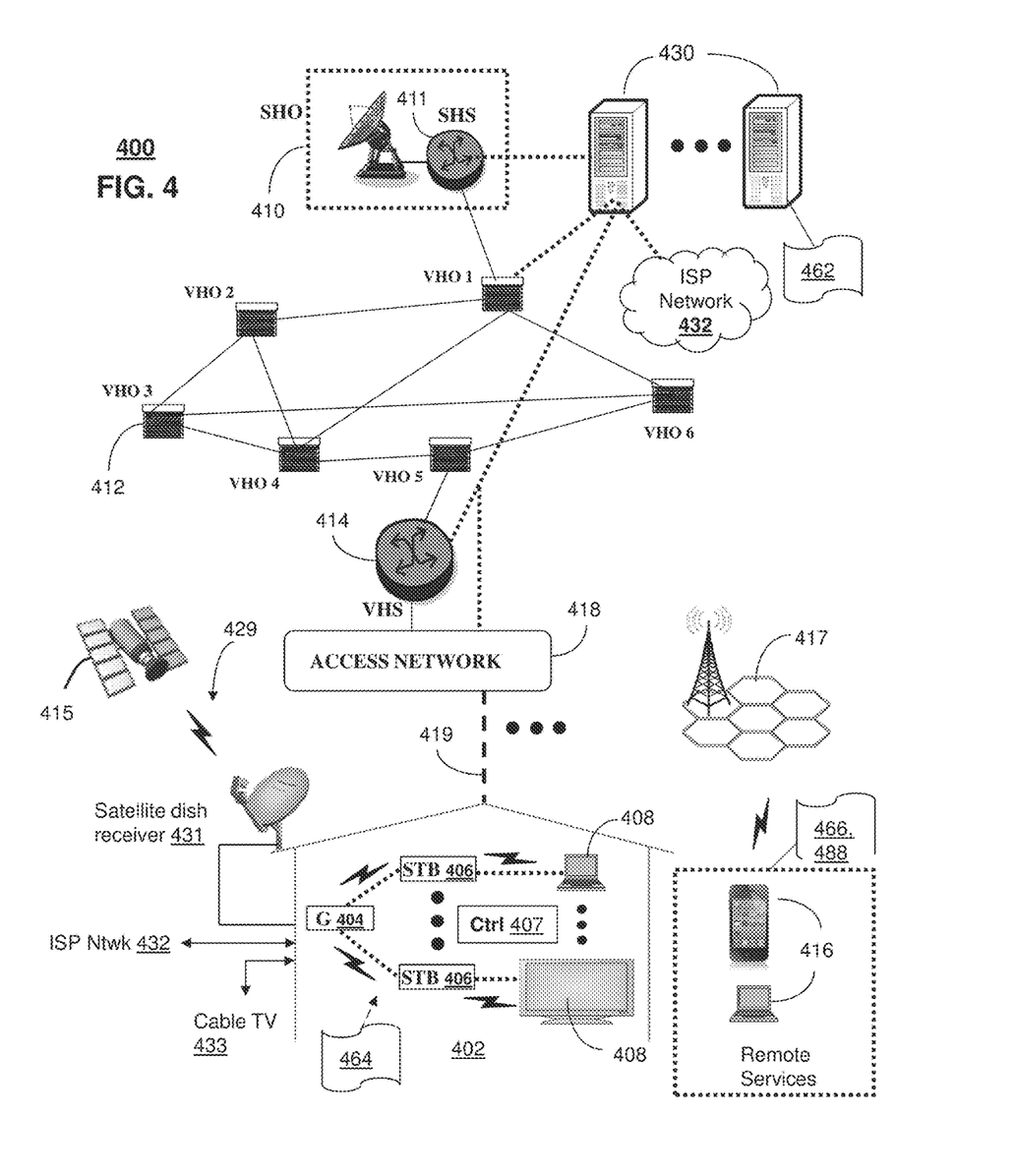
FIG. 4 depicts an illustrative embodiment of a communication system that provide media services to the system described in FIG. 1.

FIG. 4 depicts an illustrative embodiment of a first communication system 400 for delivering media content. The communication system 400 can represent an Internet Protocol Television (IPTV) media system. Communication system 400 can be overlaid or operably coupled with system 100 presented in FIG. 1 and can be configured to perform in whole or in part the steps of methods 200 and 300 of FIGS. 2 and 3 as another representative embodiment of communication system 400.

For instance, one or more devices illustrated in the communication system 400 of FIG. 4 can perform receiving, by a system comprising a processor, registration information indicating a plurality of registered communication devices in proximity to a set-top box, the plurality of registered communication devices being registered according to a communication exchange between the set-top box and each of the plurality of registered communication devices. The communication system 400 of FIG. 4 can also perform identifying a group of users associated with the plurality of registered communication devices, determining characteristics for the group of users according to the identifying of the group of users, correlating, by the system, the characteristics for the group of users, selecting a directed advertisement according to the correlating of the characteristics, and providing the directed advertisement to the set-top box for presentation.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a mobile device controller application 430. The mobile device controller application 430 can use computing and communication technology to perform providing directed advertising 462, which can include among other things, receiving a group of registered users from a gateway. For instance, providing directed advertising 462 of server 430 can be similar to the functions described for content delivery server 106 of FIG. 1. The media processors 406 and wireless communication devices 416 can be provisioned with software functions 466 and 468, respectively, to utilize the services 430. For instance, functions 466 and 468 of media processors 406 and wireless communication devices 416 can be similar to the functions described for the mobile devices 122, 124, 126, 132, and 134 of FIG. 1 and initiating control of a set-top box via a mobile device in step 302 and providing the group of registered users to a residential gateway in step 308 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
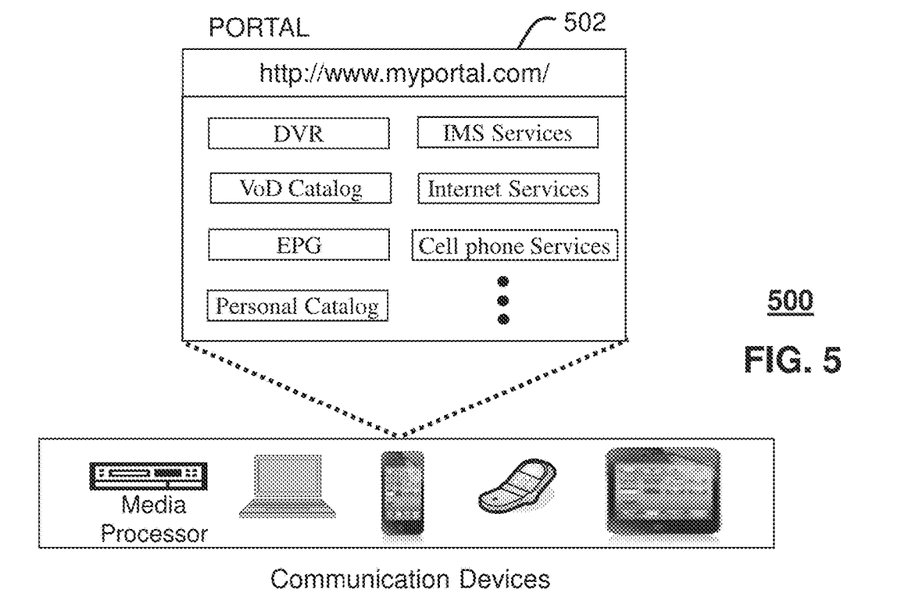
FIG. 5 depicts an illustrative embodiment of a web portal for interacting with the communication systems of FIG. 1.

FIG. 5 depicts an illustrative embodiment of a web portal 502 of a communication system 500. Communication system 500 can be overlaid or operably coupled with system 100 of FIG. 1 and communication system 400 as another representative embodiment of system 100 of FIG. 1 and communication system 400. The web portal 502 can be used for managing services of system 100 of FIG. 1 and communication system 400. The web portal 502 can be configured to perform in whole or in part the steps of methods 200 and 300 of FIGS. 2 and 3 as another representative embodiment of the web portable 502. A web page of the web portal 502 can be accessed by a Uniform Resource Locator (URL) with an Internet browser using an Internet-capable communication device such as those described in FIG. 1 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 466 and 468 to adapt these applications as may be desired by subscribers and/or service providers of system 100 of FIG. 1 and communication users wishing to control a set-top box can log into their on-line accounts and provision the remote application server 110 or server 430 with a controller application that can control the set-top box and detect other mobile devices as depicted in system 100 of FIG. 1, communication system 400, and so on. Service providers can log onto an administrator account to provision, monitor and/or maintain system 100 of FIG. 1 or server 430.

Figure 6:
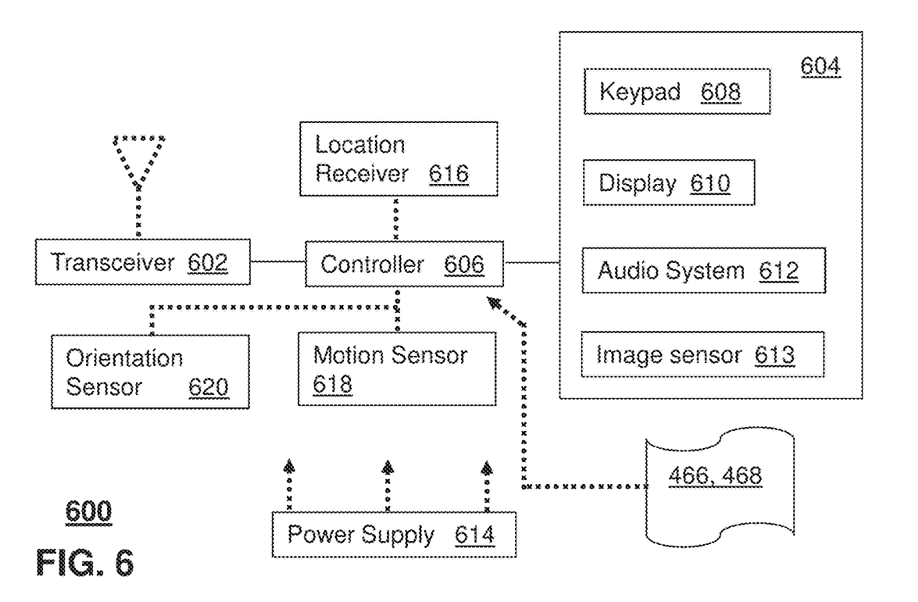
FIG. 6 depicts an illustrative embodiment of a communication device.

FIG. 6 depicts an illustrative embodiment of a communication device 600. Communication device 600 can serve in whole or in part as an illustrative embodiment of the devices depicted in system 100 of FIG. 1 and communication system 400 and can be configured to perform portions of methods 200 and 300 of FIGS. 2 and 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of system 100 of FIG. 1, the media processor 406, the media devices 408, or the portable communication devices 416 of FIG. 4. It will be appreciated that the communication device 600 can also represent other devices that can operate system 100 of FIG. 1, communication systems 400 of FIG. 4 such as a gaming console and a media player. In addition, the controller 606 can be adapted in various embodiments to perform the functions 466 and 468, respectively.

Upon reviewing the aforementioned embodiments, it would be evident to an artisan with ordinary skill in the art that said embodiments can be modified, reduced, or enhanced without departing from the scope of the claims described below. For example, short-distance communications systems, such as BlueTooth, can be employed between any of the set-top boxes and the mobile communication devices described in the subject disclosure. The mobile communication devices can include cell phones, personal data assistants, tablets, personal computers, and laptops. These devices can communicate with each other, set-top boxes in a premises, a gateway, and/or an application server to control the set-top boxes and to report on a number and identities of viewers viewing a presentation by one of the set-top boxes. In addition, viewers may be able to register their presence within at set-top boxes without having a mobile communications device through another person's mobile device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
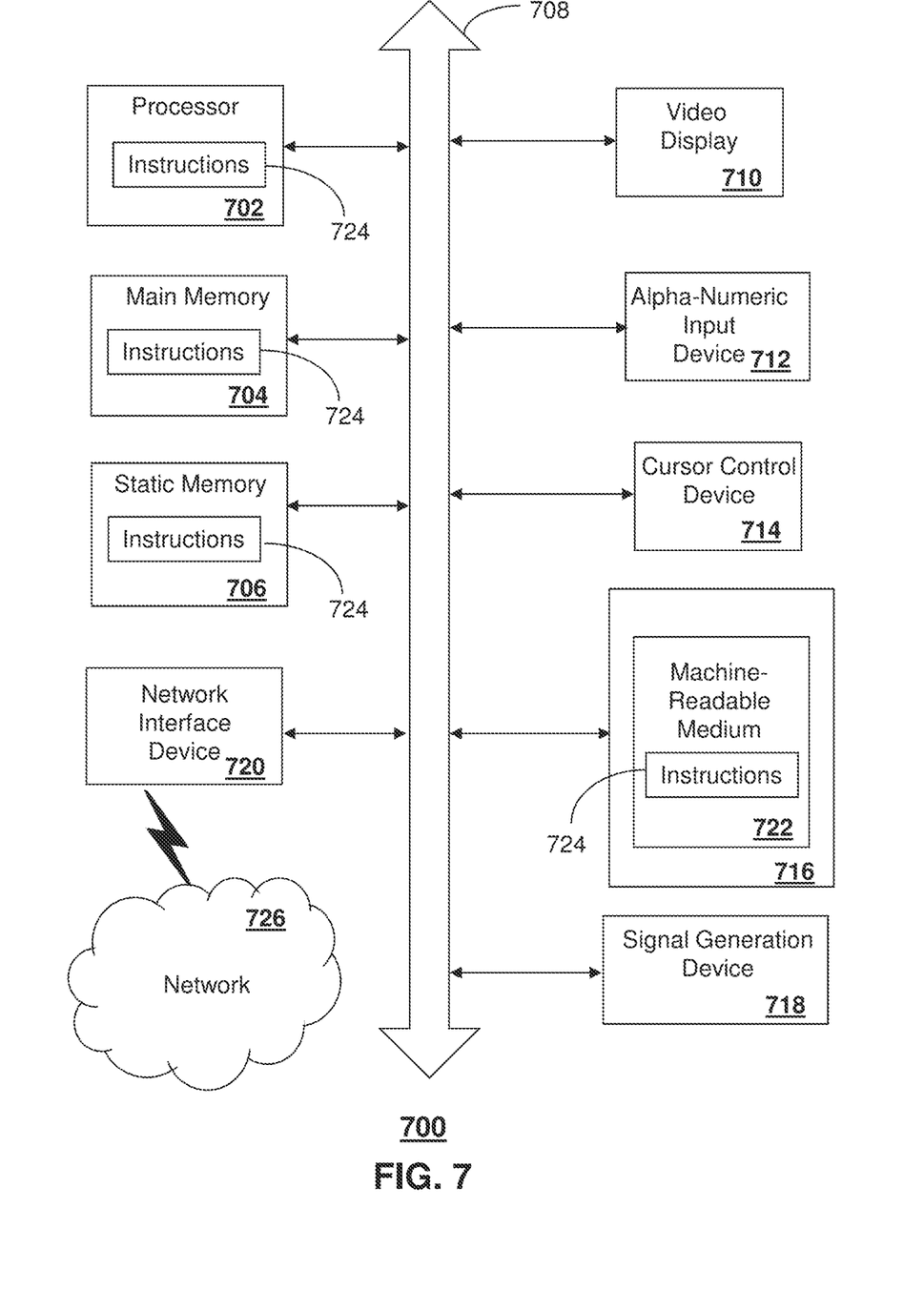
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the set-top boxes, mobile communications devices, content delivery servers, and application servers, and other devices of FIGS. 1-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 707. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments.

Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, by a processing system including a processor, that a first communication device, of a plurality of communication devices in proximity to a media processor, currently controls a presentation of a content by the media processor, wherein the plurality of communication devices comprises the first communication device and a second communication device;
   weighting, by the processing system, characteristics for a group of users associated with the plurality of communication devices, wherein the weighting comprises weighting one or more first characteristics of a first user of the first communication device that currently controls the presentation of the content by the media processor and weighting one or more second characteristics of a second user of the second communication device; and
   providing by the processing system, to the media processor to be presented, an advertisement selected according to the weighting of the one or more first characteristics and the weighting of the one or more second characteristics.

2. The method of claim 1, further comprising:
   identifying, by the processing system, the group of users; and
   determining, by the processing system, the characteristics for the group of users;
   wherein the determining the characteristics for the group of users comprises determining the characteristics for the group of users according to the identifying of the group of users.

3. The method of claim 1, wherein a preference is given to the weighting of the one or more first characteristics relative to the weighting of the one or more second characteristics.

4. The method of claim 1, further comprising:
   detecting, by the processing system, that a newly detected communication device that was not in proximity to the media processor is now in proximity to the media processor;
   revising the weighting, by the processing system, of the characteristics for the group of users based on third characteristics of a user of the newly detected communication device;
   selecting, by the processing system, a second advertisement according to the revising of the weighting of the characteristics; and
   providing, by the processing system, the second advertisement to the media processor to be presented.

5. The method of claim 1, further comprising receiving, by the processing system, registration information indicating the plurality of communication devices, the plurality of communication devices being registered according to a communication exchange between the media processor and each of the plurality of communication devices.

6. The method of claim 5, further comprising:
   receiving, by the processing system, updated registration information indicating that a non-proximal communication device of the plurality of communication devices is no longer in proximity to the media processor;
   revising the weighting, by the processing system, of the characteristics for the group of users based on excluding one or more characteristics of a user of the non-proximal communication device;
   selecting, by the processing system, a second advertisement according to the revising of the weighting of the characteristics; and
   providing, by the processing system, the second advertisement to the media processor to be presented.

7. The method of claim 5, further comprising:
   receiving, by the processing system, updated registration information indicating that a proximal communication device that was not in proximity to the media processor is now in proximity to the media processor;
   revising the weighting, by the processing system, of the characteristics for the group of users based on one or more characteristics of a user of the proximal communication device;
   selecting, by the processing system, a second advertisement according to the revising of the weighting of the characteristics; and
   providing, by the processing system, the second advertisement to the media processor to be presented.

8. The method of claim 5, wherein the receiving of the registration information is via a wireless interface.

9. The method of claim 8, wherein the wireless interface comprises one of a gateway and an access point.

10. The method of claim 1, wherein the weighting of the characteristics for the group of users further comprises:
identifying a non-viewing user of the group of users that is in proximity to the media processor and not viewing content being presented by the media processor, wherein the identifying of the non-viewing user of the group of users is based on image pattern recognition of an image of a viewing area of the media processor; and
excluding one or more non-viewer characteristics of the non-viewing user from the weighting of the characteristics for the group of users.

11. The method of claim 1, wherein each of the first communication device and the second communication device is a cell phone, a personal data assistant, a tablet, a personal computer, a laptop, or any combination thereof.

12. A media processor comprising:
a memory that stores instructions; and
a processor coupled to the memory, wherein responsive to executing the instructions, the processor performs operations, the operations comprising:
determining that a first communication device, of a plurality of communication devices in proximity to the media processor, currently controls a presentation of a content by the media processor, wherein the plurality of communication devices comprises the first communication device and a second communication device;
providing identification information relating to a group of users, including a first user and a second user, to a content delivery server to enable the content delivery server to perform weighting of characteristics for the group of users, wherein the weighting comprises a first weighting of one or more first characteristics of the first user of the first communication device that currently controls the presentation of the content by the media processor and a second weighting of one or more second characteristics of the second user of the second communication device;
receiving an advertisement directed to the group of users from the content delivery server, the advertisement being selected in accordance with the first weighting of the one or more first characteristics and the second weighting of the one or more second characteristics; and
presenting the advertisement.

13. The media processor of claim 12, wherein a preference is given to the first weighting of the one or more first characteristics relative to the second weighting of the one or more second characteristics, and wherein the operations further comprise identifying the plurality of communication devices in proximity to the media processor, the plurality of communication devices being registered according to a communication exchange between the media processor and each of the plurality of communication devices.

14. The media processor of claim 13, wherein the identifying the plurality of communication devices in proximity to the media processor comprises detecting a signal from each one of the plurality of communication devices.

15. The media processor of claim 14, wherein the detecting the signal from each one of the plurality of communication devices comprises comparing a strength of each one of the signals against a threshold signal strength to determine if each one of the plurality of communication devices is in a predetermined distance to the media processor.

16. The media processor of claim 14, wherein the identifying the plurality of communication devices in proximity to the media processor further comprises confirming that the plurality of communication devices are in a same room as the media processor by employing a camera to track users of the plurality of communication devices.

17. A non-transitory machine-readable storage medium comprising executable instructions that, when executed by a processing system including a processor, perform operations, the operations comprising:
weighting one or more first characteristics of a first user of a first mobile communication device currently controlling a presentation of a content by a media processor and weighting one or more second characteristics of a second user of a second mobile communication device, wherein the weighting of the one or more first characteristics and the weighting of the one or more second characteristics results in weighting information; and
providing the weighting information to a content delivery server to initiate delivery by the content delivery server of an advertisement selected according to the weighting of the one or more first characteristics and the weighting of the one or more second characteristics.

18. The non-transitory machine-readable storage medium of claim 17, wherein a preference is given to the weighting of the one or more first characteristics relative to the weighting of the one or more second characteristics, and wherein the operations further comprise:
detecting that the media processor is in proximity to the first mobile communication device and the second mobile communication device;
identifying one or more additional communication devices in proximity to the media processor; and
providing updated information to the content delivery server indicating that the one or more additional communication devices are in proximity to the media processor to initiate delivery by the content delivery server of an updated advertisement directed at targeting one or more users of the one or more additional communication devices based on characteristics of the one or more users of the one or more additional communication devices.

19. The non-transitory machine-readable storage medium of claim 18, wherein the operations further comprise:
identifying that a non-proximal communication device of the one or more additional communication devices is no longer in proximity to the media processor;
generating revised information to exclude the non-proximal communication device; and
providing the revised information to the content delivery server to initiate delivery of another updated advertisement to the media processor.

20. The non-transitory machine-readable storage medium of claim 18, wherein the operations further comprise:
identifying a new communication device that is not part of the one or more additional communication devices;
generating revised information to recognize the new communication device; and
providing the revised information to the content delivery server to initiate delivery of another updated advertisement to the media processor.

* * * * *